United States Patent [11] 3,620,566

| [72] | Inventor | Jacky Leconte<br>Billancourt, France |
|---|---|---|
| [21] | Appl. No. | 875,837 |
| [22] | Filed | Nov. 12, 1969 |
| [45] | Patented | Nov. 16, 1971 |
| [73] | Assignees | Regie Nationale Des Usines Renault<br>Billancourt, France;<br>Automobiles Peugeot<br>Paris, France |
| [32] | Priority | Nov. 13, 1968, France, 173,512 |

[54] DOOR ARMRESTS OF AUTOMOTIVE VEHICLES
2 Claims, 3 Drawing Figs.
[52] U.S. Cl.................................................. 296/153,
248/118, 297/412
[51] Int. Cl....................................................... B60n 1/06
[50] Field of Search............................................296/153, 31
P, 70; 280/150 B; 180/90; 297/412; 248/118

[56] References Cited
UNITED STATES PATENTS
2,794,671  6/1957  Clark............................  296/153
3,362,749  1/1968  Clement........................  297/412
3,400,979  9/1968  James............................  296/153 X
FOREIGN PATENTS
1,152,117  5/1969  Great Britain................  296/153

*Primary Examiner*—Benjamin Hersh
*Assistant Examiner*—John A. Pekar
*Attorney*—Stevens, Davis, Miller & Mosher ABSTRACT: Armrest for the passengers' compartment of automotive vehicles, of the type comprising a resilient external body enclosing a metal element adapted to coact with an element of the vehicle body, characterized in that said metal element consists of a sheet metal pressing formed with at least two identical lateral bent portions disposed on either side of a plane extending transversely to the armrest and adapted to be distorted about vertical axes.

PATENTED NOV 16 1971 3,620,566

DOOR ARMRESTS OF AUTOMOTIVE VEHICLES

The present invention is concerned with an improved armrest for doors of automotive vehicles, which consists of a metal pressing covered with a flexible element, and more particularly an armrest adapted to reduce the consequences of an accidental shock, in case of crash, of the driver or passenger against the lateral walls of the passengers' compartment.

Various attempts have already been made with a view to reduce the consequences of shocks by using flexible armrests, generally of cellular plastic material, stapled or cemented to the wall of the vehicle. These armrests require for their manufacture a large quantity of damping material having nevertheless a certain stiffness preventing any appreciable lateral collapse in relation to the passenger sitting next to the door provided with this armrest.

Armrests consisting basically of a sheet metal pressing, rigid or not with the door panel and covered or lined with a flexible prefabricated element, are already known. In this specific structure the possibilities of lateral collapse of the armrest are not sufficient and the risk of distortion of the vehicle walls are increased due to the pressure exerted through the rigid component of the armrest against its mounting panel.

The armrest according to this invention is made of a resilient material adapted to collapse laterally to a predetermined extent without penetrating into the panel to which it is secured. This armrest comprising a sheet metal inner pressing or like member adapted to coact with an element of the vehicle body is characterized in that said sheet metal pressing is formed with at least two identical lateral bent portions disposed on either side of a plane perpendicular to the armrest, the distortion of said bent portions taking place in case of shock by a movement of their edges toward each other about vertical axes.

The armrest thus constructed can collapse laterally as a consequence of a shock, without any interference due to the presence of rigid elements, through a predetermined distance depending on the distortion of said lateral bent portion of the inner metal structure or element.

A typical form of embodiment of the armrest of this invention is described hereinafter by way of example with reference to the attached drawing, in which.

Figure 1:
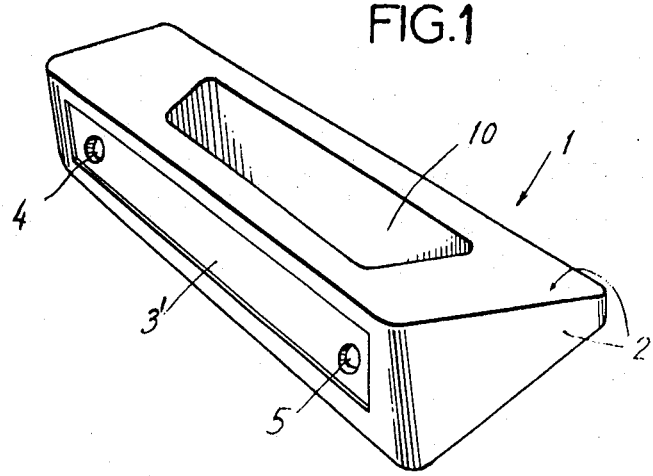
FIG. 1 is a perspective view of a complete armrest constructed according to the teachings of this invention.
Figure 2:
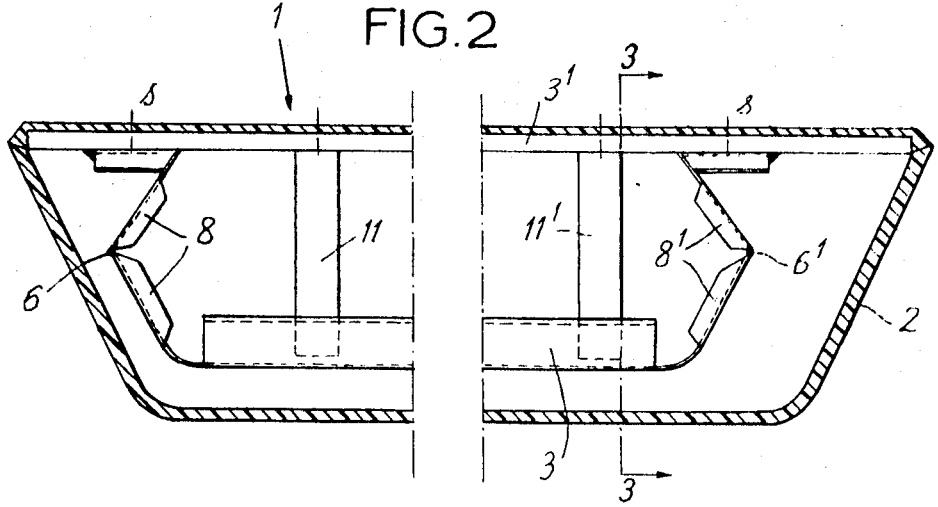
FIG. 2 is a section taken along line 2—2 of FIG. 3.
Figure 3:
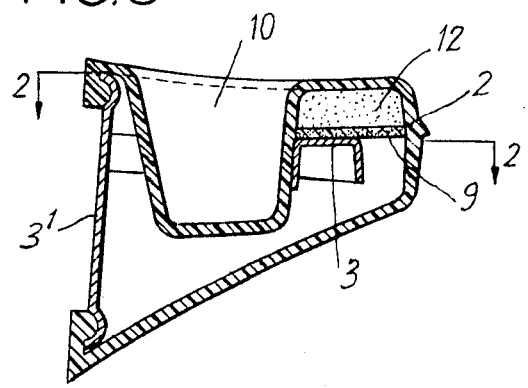
FIG. 3 is a section taken along the line 3—3 of FIG. 2.

Referring to the drawing, the armrest 1 according to this invention comprises a prefabricated flexible body 2 of cellular plastic material; fitted to a sheet metal pressing 3 secured to a longitudinal baseplate 3' by weld spots s. The flexible body 2 is formed with orifices 4 and 5 to permit the passage of the members for securing the armrest to the coachwork or body of the vehicle. The pressing 3 comprises two lateral substantially V-shaped bent portions 6 and 6' disposed on either side of a transverse plane perpendicular to the armrest and adapted, in case of shock, to be distorted about vertical axes. However, the shape and number of these bent portions should not be construed as being strictly limited to those illustrated in the exemplary form of embodiment shown in FIG. 2. The bent portions 6 and 6' comprise bent lugs 8 and 8' adapted to support an intermediate cardboard sheet 9 and a semirigid foam or cellular padding element 12 covered with the flexible body 2 (FIG. 3). A pair of tie members 11 and 11' connect the baseplate 3' to said pressing 3 and prevent the distortion of this pressing when the armrest is pulled by a user.

In the form of embodiment illustrated in the drawing the armrest comprises a central cavity 10 adapted to facilitate the gripping thereof and the opening or closing of the vehicle door by the driver or passenger.

Of, course, various modifications and variations may be brought to the specific form of embodiment of the present invention which is shown and described herein, without departing from the spirit and scope of the invention as set forth in the appended claims.

What is claimed as new is:

1. A shock-absorbing armrest for the passenger compartment of vehicles comprising a backplate adapted to be mounted on a lateral wall of said compartment, a sheet metal member mounted on said backplate in cantilevered fashion, said sheet metal member having an intermediate portion extending substantially parallel to said backplate and two identical lateral V-shaped bent end portions connected to said backplate, the axes of said bent end portions being substantially vertical, at least one lug extending substantially horizontally from an upper edge of said member, a padding element of semirigid material supported by said at least one lug, and a flexible body of cellular plastic material enclosing said member and padding and secured to said backplate, said flexible body having a portion defining a central cavity between said member and said backplate which cavity serves for the gripping of said armrest.

2. An armrest according to claim 1, further comprising tie members extending between said backplate and said member preventing the outward distortion of the latter with respect to the former.

* * * * *